United States Patent
Vian et al.

(10) Patent No.: US 9,214,021 B2
(45) Date of Patent: Dec. 15, 2015

(54) DISTRIBUTED POSITION IDENTIFICATION

(71) Applicant: The Boeing Company, Chicago, IL (US)

(72) Inventors: John Lyle Vian, Renton, WA (US); Emad William Saad, Renton, WA (US); Carson Jonathan Reynolds, Tokyo (JP)

(73) Assignee: THE BOEING COMPANY, Chicago, IL (US)

( * ) Notice: Subject to any disclaimer, the term of this patent is extended or adjusted under 35 U.S.C. 154(b) by 171 days.

(21) Appl. No.: 13/647,866

(22) Filed: Oct. 9, 2012

(65) Prior Publication Data

US 2014/0098990 A1    Apr. 10, 2014

(51) Int. Cl.
*G06K 9/00* (2006.01)
*G06T 7/00* (2006.01)

(52) U.S. Cl.
CPC .......... *G06T 7/004* (2013.01); *G06K 9/00671* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 4,671,650 A | 6/1987 | Hirzel et al. | |
| 6,088,469 A * | 7/2000 | Fukumura et al. | 382/103 |
| 6,711,293 B1 | 3/2004 | Lowe | |
| 6,950,552 B2 | 9/2005 | Nair et al. | |
| 7,511,736 B2 | 3/2009 | Benton | |
| 7,941,271 B2 * | 5/2011 | Ofek | 701/412 |
| 8,369,872 B2 * | 2/2013 | Gessner et al. | 455/456.2 |
| 8,818,043 B2 * | 8/2014 | Fairfield et al. | 382/104 |
| 2003/0225479 A1 * | 12/2003 | Waled | 700/245 |
| 2006/0064202 A1 * | 3/2006 | Gutmann et al. | 700/245 |
| 2008/0063270 A1 * | 3/2008 | McClelland et al. | 382/170 |
| 2008/0109114 A1 * | 5/2008 | Orita et al. | 700/248 |
| 2008/0129825 A1 * | 6/2008 | DeAngelis et al. | 348/169 |
| 2008/0247602 A1 * | 10/2008 | Fields et al. | 382/106 |
| 2009/0073030 A1 * | 3/2009 | Hansen et al. | 342/357.1 |
| 2010/0017115 A1 * | 1/2010 | Gautama | 701/202 |
| 2011/0037839 A1 * | 2/2011 | Kurth et al. | 348/61 |
| 2011/0095908 A1 * | 4/2011 | Nadeem et al. | 340/905 |
| 2012/0062702 A1 * | 3/2012 | Jiang et al. | 348/46 |
| 2012/0250528 A1 * | 10/2012 | Yamada et al. | 370/250 |
| 2012/0290152 A1 * | 11/2012 | Cheung et al. | 701/2 |
| 2012/0304085 A1 * | 11/2012 | Kim et al. | 715/763 |
| 2013/0038717 A1 * | 2/2013 | Reynolds et al. | 348/135 |
| 2013/0050499 A1 * | 2/2013 | Siklossy et al. | 348/169 |
| 2014/0267700 A1 * | 9/2014 | Wang et al. | 348/135 |

FOREIGN PATENT DOCUMENTS

| | | | |
|---|---|---|---|
| CN | 101762277 A | 6/2010 | |
| EP | 2112630 A2 | 10/2009 | |
| EP | 2246664 A1 | 11/2010 | |

OTHER PUBLICATIONS

Saad et al., "Vehicle Base Station," filed May 18, 2010, U.S. Appl. No. 12/782,525, 52 Pages.

(Continued)

*Primary Examiner* — Shervin Nakhjavan
(74) *Attorney, Agent, or Firm* — Yee & Associates, P.C.

(57) ABSTRACT

A method and apparatus for identifying a position of a mobile platform. Images are provided by a camera system on a first mobile platform. The images include images of a second platform. An identified position of the first mobile platform is generated using the images and the position information for the second platform. The position information for the second platform identifies a location of the second platform.

17 Claims, 6 Drawing Sheets

(56) References Cited

OTHER PUBLICATIONS

Vian "Vehicle Base Station," filed Jul. 11, 2010, U.S. Appl. No. 12/814,322, 57 Pages.

Reynolds et al., "Image Based Position Determination," filed Aug. 9, 2011, U.S. Appl. No. 13/206,456, 55 Pages.

Neumann et al., "Natural Feature Tracking for Augmented-Reality", IEEE Transactions on Multimedia, vol. 1, Issue 1, pp Mar. 1999, 35 Pages.

"The World's First ¼-inch 5-Megapixel SoC Image Sensor with OmniBSI Technology," OV5642 5-Megapixel Product Brief, OmniVision Technologies, Inc., Dec. 2009, 2 Pages, accessed Jun. 21, 2011 http://www.ovt.com/products/sensorphp?id=65".

Wagner et al, "Pose Tracking from Natural Features on Mobile Phones," 7th IEEE/ACM International Symposium on Mixed and Augmented Reality, Sep. 2008, 10 Pages.

Roberti et al., "Hybrid Collaborative Stereo Vision System for Mobile Robots Formation," International Journal of Advanced Robotic Systems, vol. 6, No. 4, Dec. 2009, pp. 257-266.

Little, "Robot Partners: Collaborative Perceptual Robotic Systems," First International Workshop on Cooperative Distributed Vision, Oct. 1997, 24 Pages.

Gore et al., "A Mobile Robot That Learns Its Place," MIT Press Journals, Neural Computation, vol. 9, No. 3, Mar. 1997, pp. 683-699.

Nister et al., "Visual Odometry," Proceedings of the 2004 IEEE Computer Society Conference on Computer Vision and Pattern Recognition, vol. 1, Jun. 2004, pp. 652-659.

GB search report dated Jan. 4, 2013 egarding application GB1214296.4, reference P55613GB/RGBH, applicant The Boeing Company, 6 pages.

\* cited by examiner

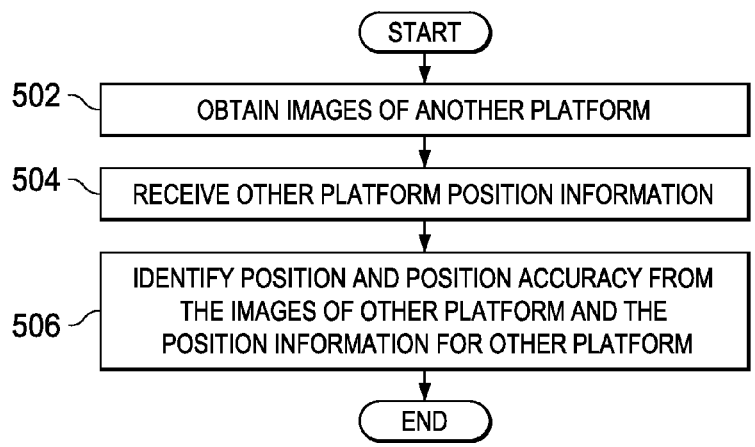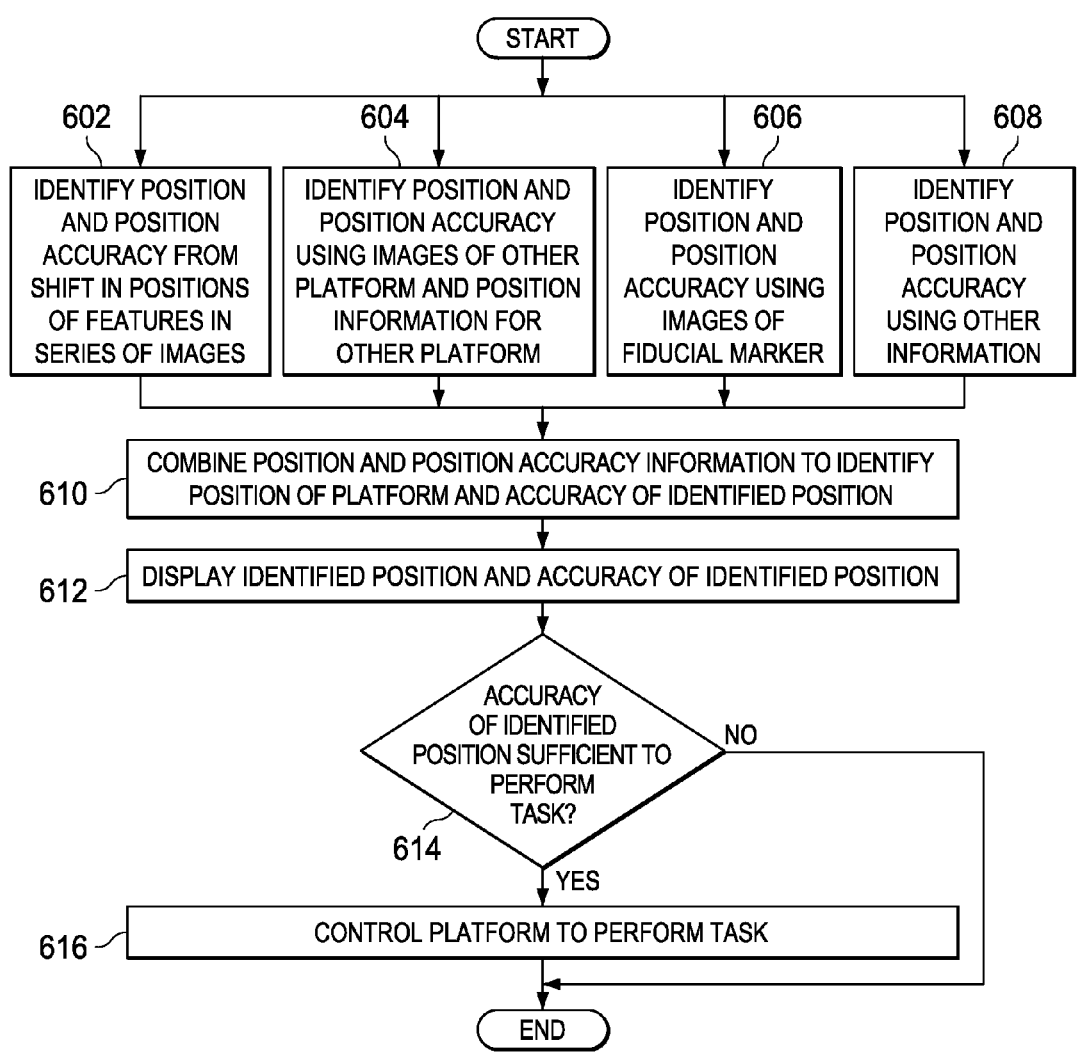

DISTRIBUTED POSITION IDENTIFICATION

BACKGROUND INFORMATION

1. Field

The present disclosure relates generally to identifying the position of a mobile platform, such as a robot or an unmanned air vehicle, and to identifying the accuracy of the identified position of the mobile platform. More particularly, the present disclosure relates to a method and apparatus for identifying the position of a mobile platform using images obtained from a camera system on the mobile platform and position information received from other mobile platforms and devices.

2. Background

Mobile platforms may be used to perform a variety of tasks in various environments. For example, a robot is an example of an automated mobile platform. A robot may be used to perform various tasks for manufacturing a product in a factory or other environment. For example, a number of robots may be used to assemble an aircraft or another vehicle or other product.

An unmanned air vehicle is another example of an automated mobile platform. An unmanned air vehicle may be used to perform a variety of missions in various operating environments. For example, an unmanned air vehicle may be controlled to perform various tasks while performing a surveillance mission or other mission.

The position of a mobile platform in an operating environment may be defined by the location of the platform in the operating environment, the orientation of the platform in the operating environment, or both. Accurately controlling the position of a mobile platform in an operating environment is desirable so that the tasks performed by the platform may be performed effectively. Accurately identifying the position of the mobile platform in the operating environment at any point in time may be desirable so that the position of the mobile platform in the operating environment may be accurately controlled.

For example, the position of an unmanned air vehicle or other aircraft at any point in time may be defined in terms of the location of the aircraft in three-dimensional space, the orientation of the aircraft, or both the location and orientation of the aircraft. For example, the location of an aircraft may be defined by geographic coordinates and the altitude of the aircraft. The orientation of an aircraft may be defined in terms of an angle of the aircraft in relation to a given line or plane, such as the horizon. The orientation of the aircraft may be referred to as the attitude. The attitude of an aircraft may be described with reference to three degrees of freedom, referred to as roll, pitch, and yaw.

Various systems may be used to identify the position of a mobile platform. For example, the location of an unmanned air vehicle or other aircraft may be identified using a global positioning system (GPS). In this case, global positioning system hardware on the aircraft includes a receiver configured to receive signals from a number of satellites. Additional hardware and software on the aircraft identifies the current location of the aircraft from the received satellite signals.

Alternatively, a radio navigation system on the aircraft may be used to identify the current location of the aircraft from radio signals received from a number of known locations on the ground. Various hardware or hardware and software systems also may be used to identify the orientation of the aircraft. For example, an electromechanical gyroscope system may be used to identify the attitude of the aircraft at any point in time.

Accurate knowledge of the current position of an unmanned air vehicle or other aircraft in an operating environment is desirable for effectively controlling the aircraft to perform a mission. Current systems and methods for identifying the position of an aircraft may affect efficient operation of the aircraft.

Current systems and methods for identifying the position of an aircraft in an operating environment may not identify the position of the aircraft as accurately as desired in various operating environments, under various operating conditions, or in other situations. For example, global positioning systems (GPS) and radio navigation systems may not be able to identify accurately the position of an aircraft in some cases, such as when the signals used by these systems are not available or are blocked from being received by the aircraft by features in the operating environment.

Current systems and methods for identifying the positions of other mobile platforms in various operating environments also may not identify the current position of the mobile platform as accurately as desired in various operating environments, operating conditions, or other situations. For example, indoor positioning systems may not be able to identify accurately the position of the platform in some cases, such as when signals are blocked from being received by the platform. In other cases, systems on-board the platform may not be able to identify accurately the position of the platform over periods of time, such as when initial conditions are inaccurate and when errors have accumulated due to sensor drift, wheel slippage, or for other reasons.

Accordingly, it would be beneficial to have a method and apparatus that takes into account one or more of the issues discussed above, as well as possibly other issues.

SUMMARY

An illustrative embodiment of the present disclosure provides a method for identifying a position of a mobile platform. Images are provided by a camera system on a first mobile platform. The images include images of a second platform. An identified position of the first mobile platform is determined using the images and position information for the second platform. The position information for the second platform identifies a location of the second platform.

Another illustrative embodiment of the present disclosure provides an apparatus comprising a camera system, a communications system, and a position identifier. The camera system is on a first mobile platform and is configured to provide images, wherein the images include images of a second mobile platform. The communications system is configured to receive position information for the second mobile platform from the second mobile platform. The position information for the second mobile platform identifies a location of the second mobile platform. The position identifier is configured to determine an identified position of the first mobile platform using the images and the position information for the second mobile platform.

Another illustrative embodiment of the present disclosure provides a method for identifying a position of a mobile platform. A plurality of identified positions for the mobile platform are determined using a plurality of different methods. The plurality of identified positions for the mobile platform are combined to generate a final identified position for the mobile platform.

Features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of an illustrative embodiment of the present disclosure when read in conjunction with the accompanying drawings, wherein:

FIG. 5 is an illustration of a flowchart of a process for identifying a position of a platform in accordance with an illustrative embodiment;

FIG. 6 is an illustration of a flowchart of a process for identifying a position of a platform and controlling the platform in accordance with an illustrative embodiment.

DETAILED DESCRIPTION

Figure 1:
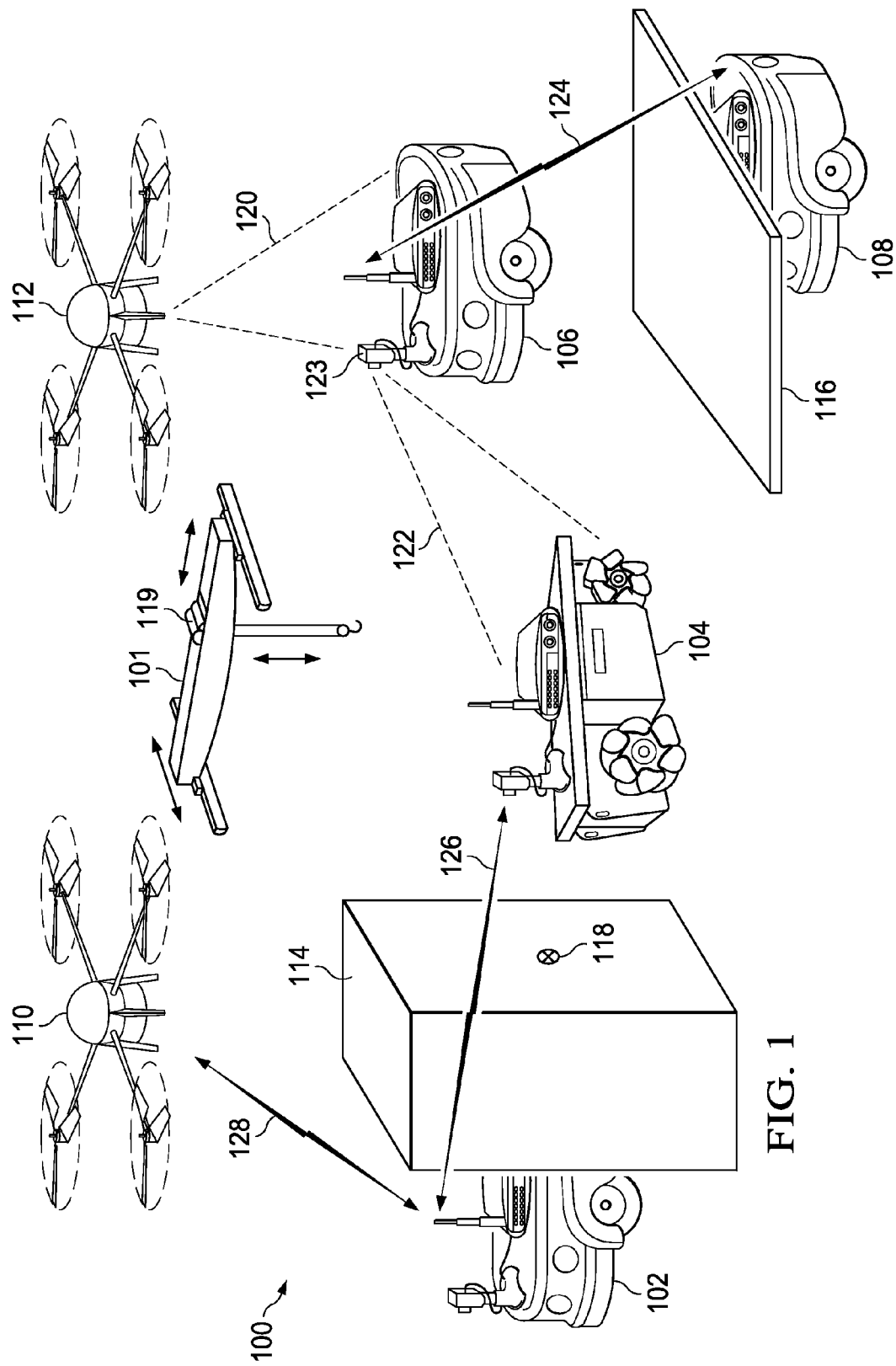
FIG. 1 is an illustration of a number of mobile platforms in an operating environment in accordance with an illustrative embodiment.

The different illustrative embodiments recognize and take into account a number of different considerations. "A number", as used herein with reference to items, means one or more items. For example, "a number of different considerations" are one or more different considerations.

The different illustrative embodiments recognize and take into account that current systems and methods for identifying the position of a mobile platform may not identify the position of the mobile platform as accurately as desired in certain operating environments, operating conditions, or other situations. For example, the availability of current systems and methods for identifying the position of an unmanned air vehicle or other aircraft may be limited in many situations. Interference may affect global positioning system and radio navigation system signals in some operating environments. Such signals may not penetrate into an enclosed area in which an aircraft is operating or may be jammed or subject to other interference.

Further, the different illustrative embodiments recognize and take into account that motion capture systems may be used to identify the location and orientation of a mobile platform. However, such systems may be affected by occlusion by objects in the operating environment and may be sensitive to lighting conditions in the operating environment. Odometry, inertial sensors, and other dead-reckoning systems and methods for identifying the position of a mobile platform may be prone to various inaccuracies. Simultaneous localization and mapping systems may be computer-resource intensive and sensitive to sensor performance and noise.

The different illustrative embodiments recognize and take into account that stand-alone image-based systems for identifying the position of a mobile platform using images obtained from a camera system on the mobile platform may provide good quality location and orientation information for the mobile platform. However, the resolution and precision provided by such a stand-alone system may not be sufficient for some applications. For example, the resolution and precision provided by such a system may not be sufficient for applications where position identification at the sub-millimeter level is desired. Furthermore, occlusion and lighting conditions in the operating environment also may affect the identification of position information by such a system in undesired ways.

The illustrative embodiments provide a method and apparatus for providing position information for a number of mobile platforms. The position information may identify the location of a mobile platform, the orientation of the mobile platform, and the accuracy of the position information.

Illustrative embodiments may include a camera system on a mobile platform for providing images of the environment in which the mobile platform is operating, a wireless communications system for communicating with other platforms in the operating environment, and a position identifier for identifying the position of the mobile platform. The communications system may be used to receive position information for the other platforms. The position identifier may be configured to identify the position of the mobile platform from the images provided by the camera system, which may include images of the other platforms in the operating environment, and the position information for the other platforms. Image-based position identification in accordance with an illustrative embodiment enables determining an accuracy of the identified position of the mobile platform.

Position identification in accordance with an illustrative embodiment may provide more accurate identification of the position of a mobile platform in an occluded operating environment where multiple platforms may be active, such as in a factory assembly area. Providing accuracy information for an identified position of a mobile platform in accordance with an illustrative embodiment may enable more reliable use of the position information for controlling equipment or functions for performing various tasks by the mobile platform in the operating environment.

For example, by providing accuracy information for an identified position of a mobile platform, functions where various levels of position accuracy may be desired may be executed more reliably and with greater safety. For functions where higher precision is desired, illustrative embodiments may identify location and orientation information more accurately using multiple platforms that may be operating in the presence of environmental challenges in an operating environment. For example, such challenges may include occlusion caused by lighting conditions, obstructions, or both, in the operating environment.

Turning now to FIG. 1, an illustration of a number of mobile platforms in an operating environment is depicted in accordance with an illustrative embodiment. For example, without limitation, operating environment 100 may be an industrial environment, such as a factory assembly area, or any other operating environment. A number of mobile platforms may be controlled for performing various tasks in operating environment 100.

In this example, the number of mobile platforms in operating environment 100 includes robots 101, 102, 104, 106, and 108 and unmanned air vehicles 110 and 112. Robots 101, 102, 104, 106, and 108 may include various types of robots configured to perform various functions in operating environment 100. For example, without limitation, robot 101 may be an industrial robot configured to perform an assembly operation or another operation or a combination of operations in operating environment 100. Similarly, unmanned air vehicles 110 and 112 may include various types of unmanned air vehicles configured to perform various functions in operating environment 100. Operating environment 100 in accordance with an illustrative embodiment may include more or fewer mobile platforms and different types of mobile platforms from those illustrated in FIG. 1.

Robots 101, 102, 104, 106, and 108, and unmanned air vehicles 110 and 112 may include image-based systems for identifying the positions of robots 101, 102, 104, 106, and 108, and unmanned air vehicles 110 and 112 in operating environment 100. For example, without limitation, such systems may include camera systems for obtaining images of objects 114 and 116 in operating environment 100. The positions of objects 114 and 116 in operating environment 100 may be fixed and may be known or unknown. In this example, object 114 includes fiducial marker 118. The position of fiducial marker 118 in operating environment 100 may be fixed and known.

The image-based systems in robots 101, 102, 104, 106, and 108, and unmanned air vehicles 110 and 112 for identifying the positions of robots 101, 102, 104, 106, and 108, and unmanned air vehicles 110 and 112 in operating environment 100 may be configured to identify the positions of robots 101, 102, 104, 106, and 108, and unmanned air vehicles 110 and 112 from the images of objects 114 and 116 and fiducial marker 118 provided by the camera systems in robots 101, 102, 104, 106, and 108, and unmanned air vehicles 110 and 112. Robots 101, 102, 104, 106, and 108, and unmanned air vehicles 110 and 112 may include various working components, such as manipulator arm 119, or various other working components. In this case, the image based systems in robots 101, 102, 104, 106, and 108, and unmanned air vehicles 110 and 112 for identifying the positions of robots 101, 102, 104, 106, and 108, and unmanned air vehicles 110 and 112 in operating environment 100 may be configured to identify the positions of such working components from the images of objects 114 and 116 and fiducial marker 118 provided by camera systems in such working components.

Objects 114 and 116 in operating environment 100 may occlude the fields of view of the camera systems on robots 101, 102, 104, 106, and 108, and unmanned air vehicles 110 and 112. For example, in this case, object 114 may occlude the view of object 116 and fiducial marker 118 from a camera system on robot 102. Occluded fields of view of the camera systems used for position identification on robots 101, 102, 104, 106, and 108, and unmanned air vehicles 110 and 112 may affect the identification of the positions of robots 101, 102, 104, 106, and 108, and unmanned air vehicles 110 and 112, or of working components thereof, in operating environment 100. Lighting conditions in operating environment 100 also may affect the identification of the positions of robots 101, 102, 104, 106, and 108, and unmanned air vehicles 110 and 112, or of working components thereof, in operating environment 100 by the image-based position identification systems on robots 101, 102, 104, 106, and 108, and unmanned air vehicles 110 and 112.

Robots 101, 102, 104, 106, and 108, and unmanned air vehicles 110 and 112 in operating environment 100 may be in the lines of sight of the camera systems on robots 101, 102, 104, 106, and 108, and unmanned air vehicles 110 and 112. For example, in this case, robot 106 may be in line of sight 120 of the camera system on unmanned air vehicle 112. In this example, robot 104 may be in line of sight 122 of camera system 123 on robot 106.

In accordance with an illustrative embodiment, robots 101, 102, 104, 106, and 108, and unmanned air vehicles 110 and 112 may include communications systems for providing wireless communications between and among robots 101, 102, 104, 106, and 108, and unmanned air vehicles 110 and 112. Such communications systems may include communications systems configured to provide optical communications links, radio frequency communications links, or other wireless communications links or combinations of communications links between and among robots 101, 102, 104, 106, and 108, and unmanned air vehicles 110 and 112.

For example, in this case, communications systems on robots 106 and 108 may be used to provide communication link 124 between robot 106 and robot 108. Communication link 124 may provide for the communication of information between robot 106 and robot 108. Communications systems on robots 102 and 104 may be used to provide communication link 126 between robot 102 and robot 104. Communication link 126 may provide for the communication of information between robot 102 and robot 104. Communications systems on robot 102 and on unmanned air vehicle 110 may be used to provide communication link 128 between robot 102 and unmanned air vehicle 110. Communication link 128 may provide for the communication of information between robot 102 and unmanned air vehicle 110.

In accordance with an illustrative embodiment, the communications links between and among robots 101, 102, 104, 106, and 108, and unmanned air vehicles 110 and 112 may be used to send position information for robots 101, 102, 104, 106, and 108, and unmanned air vehicles 110 and 112 between and among robots 101, 102, 104, 106, and 108, and unmanned air vehicles 110 and 112. This position information may be used in combination with images from the camera systems on robots 101, 102, 104, 106, and 108, and unmanned air vehicles 110 and 112, including images of robots 101, 102, 104, 106, and 108, and unmanned air vehicles 110 and 112 in operating environment 100, to provide more accurate identification of the positions of robots 101, 102, 104, 106, and 108, and unmanned air vehicles 110 and 112, or of working components thereof, in operating environment 100. In this example, robots 101, 102, 104, 106, and 108, and unmanned air vehicles 110 and 112 in operating environment 100 effectively provide more objects having identified locations in operating environment 100 that may be captured in images by the camera systems on robots 101, 102, 104, 106, and 108, and unmanned air vehicles 110 and 112 and used by the image-based systems on robots 101, 102, 104, 106, and 108, and unmanned air vehicles 110 and 112 to identify the positions of robots 101, 102, 104, 106, and 108, and unmanned air vehicles 110 and 112, or of working components thereof, in operating environment 100.

Figure 2:
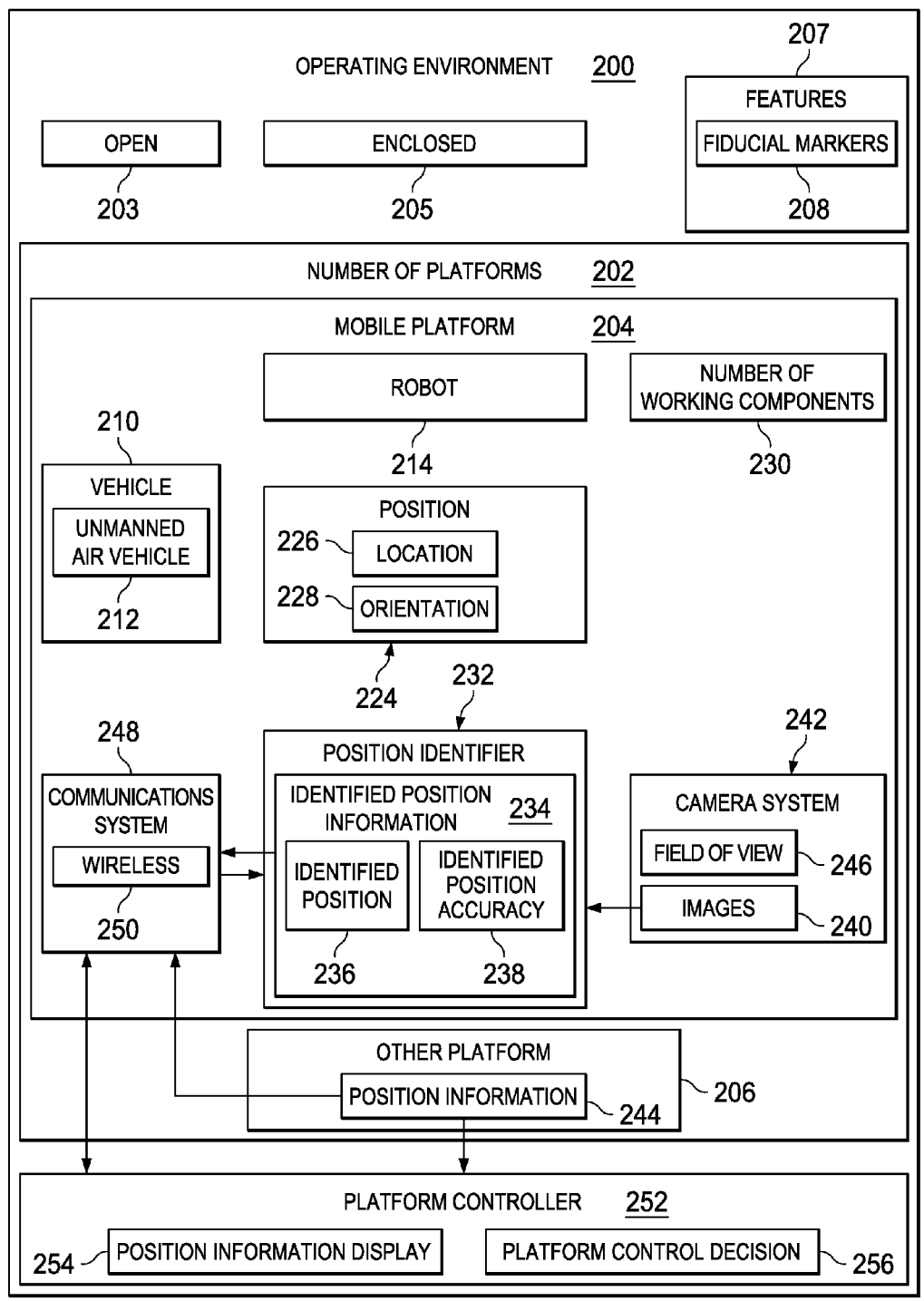
FIG. 2 is an illustration of a block diagram of an operating environment including a number of platforms in accordance with an illustrative embodiment.

Turning now to FIG. 2, an illustration of a block diagram of an operating environment including a number of platforms is depicted in accordance with an illustrative embodiment. Operating environment 100 in FIG. 1 may be an example of one implementation of operating environment 200. Robots 101, 102, 104, 106, and 108, and unmanned air vehicles 110 and 112 in FIG. 1 may be examples of implementations of number of platforms 202 in operating environment 200.

Operating environment 200 may be any environment in which number of platforms 202 may be operated to perform any task or mission. For example, operating environment 200 may be open 203 or enclosed 205. Operating environment 200 that is enclosed 205 may include, for example, without limitation, a building or other man-made structure, a cave or other naturally occurring structure, or any other natural or man-made area that is fully or partially enclosed. For example, without limitation, operating environment 200 may be an industrial environment, such as a factory assembly area, or any other environment for operation of number of platforms 202.

Operating environment 200 may include features 207. Features 207 may include man-made objects, naturally occurring objects, structures, patterns, or other objects in operating environment 200. Features 207 may be visible to a camera operating at any wavelength. The locations of features 207 in operating environment 200 may be known or unknown. Fiducial markers 208 are examples of features 207. The locations of fiducial markers 208 in operating environment 200 are known.

Number of platforms 202 may include any number of platforms of the same or different types in various combinations. For example, number of platforms 202 may include mobile platform 204 and other platform 206. Mobile platform 204 may be referred to as a first platform or first mobile platform. Other platform 206 may be referred to as a second platform or second mobile platform. Number of platforms 202 may include more than two platforms in other illustrative embodiments.

Mobile platform 204 may be configured to move through operating environment 200 to perform a task or mission in operating environment 200. In one illustrative example, mobile platform 204 may be vehicle 210. Vehicle 210 may be, for example, an aircraft or some other type of vehicle. Vehicle 210 may be, for example, without limitation, a fixed-wing aircraft, a rotary-wing aircraft, a lighter-than-air vehicle, or some other suitable type of aircraft. Vehicle 210 may include any aerospace vehicle that may operate in the air, in space, or both in the air and in space. Vehicle 210 also may include any vehicle that may operate on the ground, under water, on the surface of the water, or in any other operating medium or combinations of media. Vehicle 210 may be manned or unmanned. For example, without limitation, vehicle 210 may be unmanned air vehicle 212.

As another example, mobile platform 204 be robot 214. For example, without limitation, robot 214 may include an industrial robot or another type of robot that may be used for the manufacture, assembly, inspection, or testing of products, or for any combination of these or other functions. For example, without limitation, robot 214 may be an overhead crane. As another example, robot 214 may include a robot that is used for scientific purposes, such as deep sea or planetary exploration, or for operation in any other environment. As yet another example, robot 214 may include a robot that is used for military or crime prevention applications.

Other platform 206 may be the same type of platform as mobile platform 204 and may have the same capabilities as mobile platform 204. Alternatively, other platform 206 may be a different type of platform from mobile platform 204 or may have different capabilities from mobile platform 204, or both. Other platform 206 may or may not be mobile.

At any time, mobile platform 204 is in position 224 in operating environment 200. Position 224 may be referred to as the actual position of mobile platform 204 in operating environment 200. Position 224 may include location 226 of mobile platform 204, orientation 228 of mobile platform 204, or both location 226 and orientation 228 of mobile platform 204. Location 226 may comprise the point or points in three-dimensional space at which mobile platform 204 is located. Location 226 may be defined with reference to any three-dimensional coordinate system. For example, location 226 of unmanned air vehicle 212 may be defined by geographic coordinates and an altitude of unmanned air vehicle 212 in operating environment 200.

Orientation 228 is the angle of mobile platform 204 in relation to a given line or plane in three-dimensional space. Orientation 228 may be described with reference to three degrees of freedom, referred to as roll, pitch, and yaw. In these illustrative examples, orientation 228 of unmanned air vehicle 212 in operating environment 200 may be referred to as the attitude of unmanned air vehicle 212.

Mobile platform 204 may include number of working components 230. Number of working components 230 may include parts of mobile platform 204 that may be used to perform tasks at specific positions in operating environment 200. For example, without limitation, number of working components 230 may include manipulator arms or other working components or various combinations of working components. Number of working components 230 may be moveable or fixed with respect to other portions of mobile platform 204. In the present application, including in the claims, position 224 of mobile platform 204 may refer to the position of number of working components 230 of mobile platform 204 in operating environment 200. In some cases, mobile platform 214 may be a working component of a larger fixed or mobile platform in number of platforms 202.

In accordance with an illustrative embodiment, position 224 of mobile platform 204 in operating environment 200 may be identified by position identifier 232. Position identifier 232 may be associated with mobile platform 204. For example, the components of position identifier 232 may be attached to mobile platform 204 in these illustrative examples.

Position identifier 232 may be configured to generate identified position information 234. Identified position information 234 may include information for identified position 236. Identified position 236 may include a number of values that may be calculated by position identifier 232 for identifying position 224 of platform 204. Identified position 236 is thus an estimate of position 224 of mobile platform 204. Identified position information 234 also may include identified position accuracy 238. Identified position accuracy 238 may include a number of values that may be calculated by position identifier 232 to indicate the accuracy of identified position 236. For example, identified position accuracy 238 may include a number of values that may indicated the degree to which identified position 236 is likely to be different from position 224 of platform 204.

In accordance with an illustrative embodiment, position identifier 232 may be configured to generate identified position information 234 for mobile platform 204 using images 240 provided by camera system 242 on mobile platform 204 and position information 244 for other platform 206. Images 240 may be images of operating environment 200 in which mobile platform 204 is operating and may include images of other platform 206 in operating environment 200.

Images 240 may be provided to position identifier 232 from camera system 242 on mobile platform 204. Camera system 242 may be attached to mobile platform 204 in any appropriate manner. Camera system 242 may comprise a single camera. In other illustrative embodiments, camera system 242 may comprise multiple cameras. The use of a multi-camera system may improve the accuracy of the position determination by position identifier 232.

Camera system 242 may comprise a digital or other video camera operating to obtain images at any desired wavelength. For example, without limitation, camera system 242 may generate images 240 of operating environment 200 at visible or infrared wavelengths or at multiple different wavelengths or bands of wavelengths. Camera system 242 may comprise a high speed camera. For example, without limitation, camera system 242 may operate at a frame rate of approximately 100 frames per second or at a higher frame rate. Alternatively, camera system 242 may operate at any frame rate.

In one embodiment, the wavelength, frame rate, or both the wavelength and frame rate at which camera system 242 is operated may be variable. In this case, for example, the wavelength, frame rate, or both, may be adjusted based on the particular task or mission of mobile platform 204 or the conditions of operating environment 200 in which mobile platform 204 is operating.

At any point in time, camera system 242 has a specific field of view 246. Field of view 246 is the portion of operating environment 200 that appears in images 240 generated by camera system 242. Therefore, if fiducial markers 208 or other features 207 of operating environment 200 are in field of view 246 of camera system 242, images of fiducial markers 208 or other features 207 may appear in images 240 generated by camera system 242. Similarly, if other platform 206 is in field of view 246 of camera system 242, images of other platform 206 may appear in images 240 generated by camera system 242.

In accordance with an illustrative embodiment, position identifier 232 may use known techniques to determine identified position 236 of mobile platform 204 from images 240 of objects in operating environment 200 and known locations of those objects in operating environment 200. In particular, in accordance with an illustrative embodiment, position identifier 232 may use known techniques to determine identified position 236 of mobile platform 204 from images 240 including images of other platform 206 in operating environment 200 and position information 244 for other platform 206 in operating environment 200. In accordance with an illustrative embodiment, position identifier 232 also may be configured to determine identified position accuracy 238 for identified position 236.

Position information 244 for other platform 206 may include information identifying the location of other platform 206 in operating environment 200. Position information 244 for other platform 206 may be determined by a position identification system on other platform 206. For example, without limitation, the position identification system on other platform 206 may be an image-based or other position identification system configured to generate position information 244 for other platform 206. The position identification system on other platform 206 may be similar to or different from position identifier 232 on mobile platform 204.

Mobile platform 204 may be configured to receive position information 244 for other platform 206 from other platform 206. For example, mobile platform 204 may include communications system 248. Communications system 248 may include any communications system configured to receive position information 244 from other platform 206. Communications system 248 may be wireless 250. For example, communications system 248 may be configured to provide optical communications links, radio frequency communications links, or other wireless communications links or combinations of communications links for mobile platform 204 using any appropriate communications protocols. Position information 244 for other platform 206 that is received by communications system 248 may be provided from communications system 248 to position identifier 232 for use in determining identified position 236 of mobile platform 204 by position identifier 232.

Position identifier 232 may be implemented in hardware or in hardware and software operating together. Position identifier 232 may be implemented using any hardware or combination of hardware and software that may generate identified position information 234 with sufficient speed to provide for control of the movement of mobile platform 204 to perform desired tasks in operating environment 200.

Identified position information 234 for mobile platform 204 may be provided to platform controller 252. Platform controller 252 may be configured to use identified position information 234 for mobile platform 204 to control the movement of mobile platform 204 in operating environment 200 to perform a desired task or mission. Platform controller 252 may comprise an automated controller, a human operator, or a human operator in combination with a machine. In any case, in order to control the movement of mobile platform 204 to perform a task or mission successfully, it is desirable that identified position information 234 for mobile platform 204 is determined accurately and reliably.

Platform controller 252 may be implemented entirely on mobile platform 204. Alternatively, platform controller 252 may be implemented, in whole or in part, at a location that is not on mobile platform 204. In the latter case, platform controller 252 may be in wireless communication with mobile platform 204 to control the movement of mobile platform 204 from a location that is not on mobile platform 204. For example, in this case, identified position information 234 for mobile platform 204 may be sent from mobile platform 204 to platform controller 252 via communications system 248 on mobile platform 204. Platform controller 252 may be configured to control the movement of mobile platform 204 using identified position information 234. For example, without limitation, platform controller 252 may be configured to control mobile platform 204 using control signals sent from platform controller 252 to mobile platform 204 via communications system 248 on mobile platform 204.

Platform controller 252 may be configured to display identified position information 234 for mobile platform 204 on position information display 254. Platform controller 252 may use identified position information 234 for mobile platform 204 to make platform control decision 256 for controlling the movement of mobile platform 204 to perform a task.

Platform controller 252 may be configured to control number of platforms 202 in operating environment 200 other than mobile platform 204. For example, without limitation, platform controller 252 may be configured to control mobile platform 204 and other platform 206 or various other combinations of number of platforms 202 in operating environment 200 in a coordinated or other manner.

Figure 3:
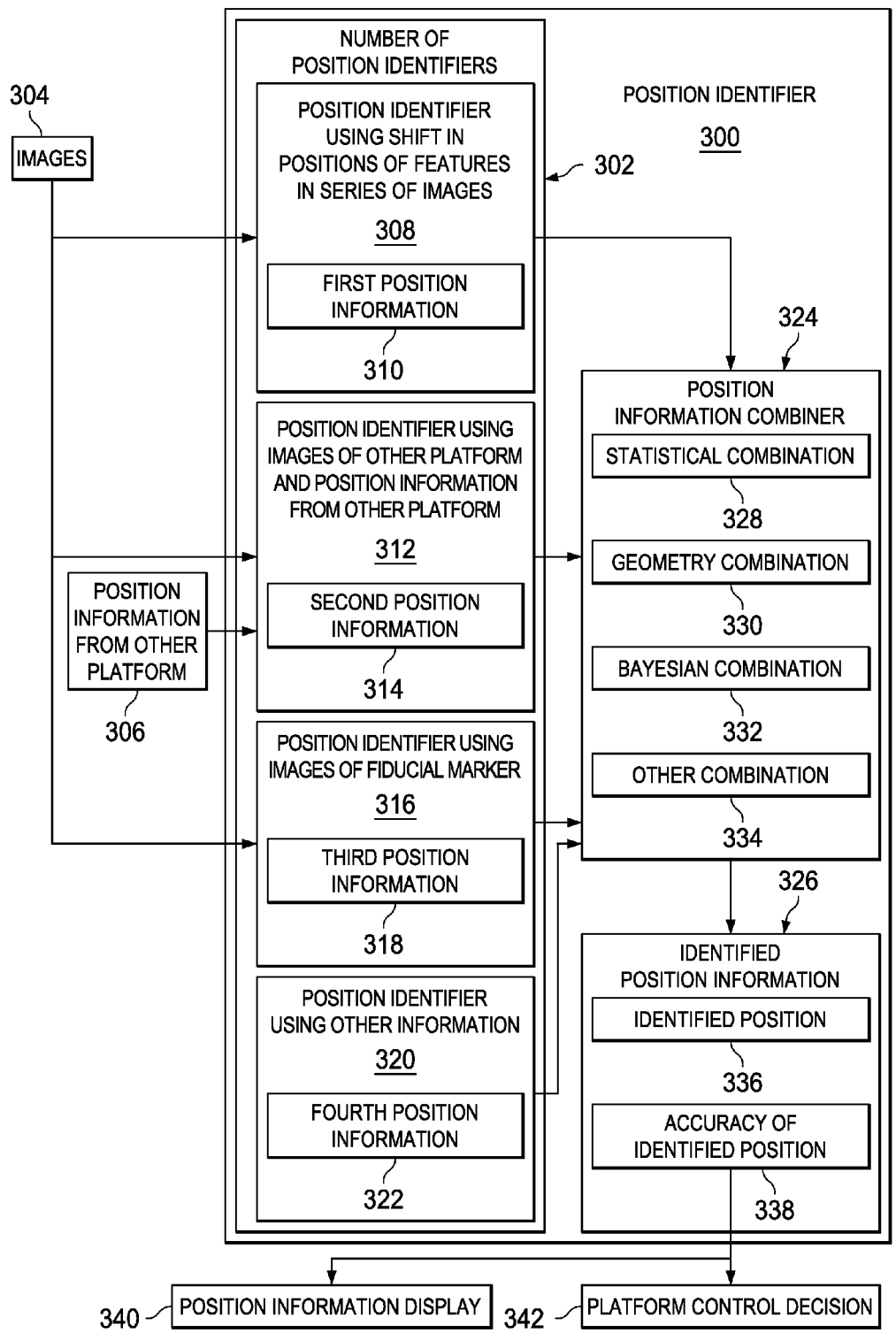
FIG. 3 is an illustration of a block diagram of a position identifier in accordance with an illustrative embodiment.

Turning now to FIG. 3 an illustration of a block diagram of a position identifier is depicted in accordance with an illustrative embodiment. In this example, position identifier 300 may be an example of one implementation of position identifier 232 in FIG. 2.

Position identifier 300 may include number of position identifiers 302. Number of position identifiers 302 may use various different methods for identifying position information for a mobile platform from images 304 obtained from a camera system on the mobile platform, position information from other platform 306, other information or various combinations of information.

For example, without limitation, number of position identifiers 302 may include position identifier using a shift in positions of features in a series of images 308 to generate first position information 310. A position identifier of this type is described, for example, in U.S. patent application Ser. No. 13/206,456, filed Aug. 9, 2011, and entitled Image Based Position Determination, the entire disclosure of which is incorporated herein by reference.

Number of position identifiers 302 may include position identifier using images of other platform and position information for other platform 312 to generate second position information 314. A position identifier of this type is described above with reference to position identifier 232 in FIG. 2.

Number of position identifiers 302 may include position identifier using images of fiducial marker 316 to generate third position information 318. Number of position identifiers 302 may include position identifier using other information 320 to identify fourth position information 322.

First position information 310, second position information 314, third position information 318, and fourth position information 322 may be combined by position information combiner 324 to generate identified position information 326. For example, position information combiner 324 may combine position information using statistical combination 328, geometry combination 330, Baysian combination 332, other combination 334, or multiple combinations.

Identified position information 326 may include identified position 336 and identified position accuracy 338. Identified position information may be displayed on position information display 340 and used to make platform control decision 342.

The illustrations of operating environment 200 in FIG. 2 and position identifier 300 in FIG. 3 are not meant to imply physical or architectural limitations to the manner in which different illustrative embodiments may be implemented. Other components in addition to, in place of, or both in addition to and in place of the ones illustrated may be used. Some components may be unnecessary in some embodiments. The blocks are presented to illustrate some functional components. One or more of these blocks may be combined or divided into different blocks when implemented in different embodiments.

Figure 4:
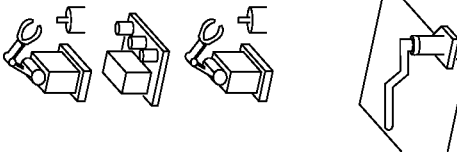
FIG. 4 is an illustration of a position information display in accordance with an illustrative embodiment.

Turning now to FIG. 4, an illustration of a position information display is depicted in accordance with an illustrative embodiment. In this example, position information display 400 may be an example of one implementation of position information display 254 in FIG. 2 or of position information display 340 in FIG. 3.

In this example, identified position information 402 and identified position accuracy information 404 are displayed for a number of robots and a number of working components on the robots. In this example, the robots are identified in column 406 of position information display 400 and the working components on the robots are identified in column 408 of position information display 400.

Turning now to FIG. 5, an illustration of a flowchart of a process for identifying a position of a platform is depicted in accordance with an illustrative embodiment. For example, this process may be implemented in position identifier 232 in FIG. 2 or position identifier 300 in FIG. 3.

The process begins by obtaining images of another platform (operation 502) and receiving other platform position information for the other platform (operation 504). The position of the platform and position accuracy then may be identified from the images of the other platform and the position information for the other platform (operation 506), with the process terminating thereafter.

Turning now to FIG. 6, an illustration of a flowchart of a process for identifying a position of a platform and controlling the platform is depicted in accordance with an illustrative embodiment. For example, this process may be implemented in position identifier 232 and platform controller 252 in FIG. 2.

The process begins by identifying position and position accuracy for the platform using various types of information and algorithms. For example, the position and position accuracy may be identified from a shift in positions of features in a series of images (operation 602). The position and position accuracy may be identified using images of another platform and position information from the other platform (operation 604). The position and position accuracy may be identified using images of a fiducial marker (operation 606). The position and position accuracy may be identified using other information (operation 608).

The position and position accuracy information from operations 602, 604, 606, and 608 may be combined to identify the position of the platform and position accuracy (operation 610). The identified position and position accuracy may be displayed (operation 612). It then may be determined whether the identified position accuracy is sufficient to perform a task (operation 614). If the identified position accuracy is not sufficient the task may not be performed, with the process terminating thereafter. If the identified position accuracy is sufficient the platform may be controlled to perform the task (operation 616) with the process terminating thereafter.

Figure 7:
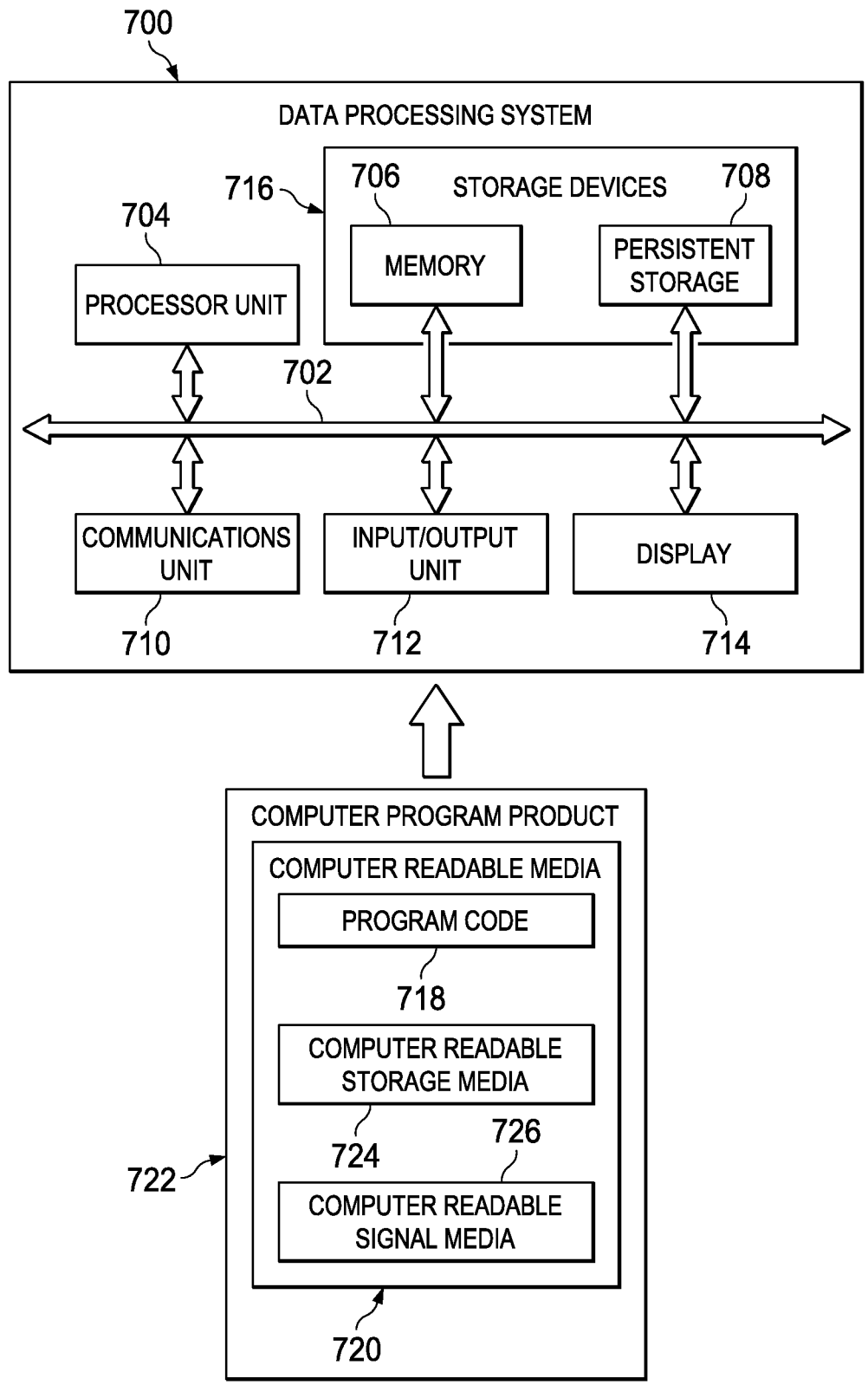
FIG. 7 is an illustration of a data processing system in accordance with an illustrative embodiment.

Turning now to FIG. 7, an illustration of a data processing system is depicted in accordance with an illustrative embodiment. In this example, data processing system 700 is an example of a system that may be used to implement the functions of position identifier 232 in FIG. 2 or position identifier 300 in FIG. 3. In this illustrative example, data processing system 700 includes communications fabric 702. Communications fabric 702 provides communications between processor unit 704, memory 706, persistent storage 708, communications unit 710, input/output unit 712, and display 714.

Processor unit 704 serves to execute instructions for software that may be loaded into memory 706. Processor unit 704 may be a number of processors, a multi-processor core, or some other type of processor, depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, or other suitable information or any combination of information either on a temporary basis or a permanent basis or both. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, or some other suitable input device or combination of devices. Further, input/output unit 712 may send output to a printer. Display 714 provides a mechanism to display information to a user.

Instructions for the operating system, applications, or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708.

Computer readable storage media 724 also may take the form of a persistent storage, such as a hard drive, a thumb drive, or a flash memory, that is connected to data processing system 700. In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, or any other suitable type of signal or combination of signals. These signals may be transmitted over communications links, such as wireless communications links, optical fiber cable, coaxial cable, a wire, or any other suitable type of communications link or combination of links. In other words, the communications link or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or transmit and receive data. Communications unit 710 may be, for example, a modem or a network adapter, two network adapters, or some combination thereof. Further, a memory may be, for example, memory 706, or a cache, such as found in an interface and memory controller hub that may be present in communications fabric 702.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

One or more of the illustrative embodiments provide a system and method for identifying the position of an aircraft that may be implemented more efficiently than current systems and that may identify the position of the aircraft more accurately and with greater reliability. In accordance with an illustrative embodiment, the position of an aircraft is determined based on a series of images generated by a camera system on the aircraft. The series of images includes features in the environment in which the aircraft is moving. These features are identified in the series of images. A shift in the perspective of the camera system is identified from the shift in the positions of the features in the series of images. A change in the position of the aircraft is identified from the shift in the perspective of the camera system. The current position of the aircraft may be identified based on the change in the position of the aircraft and a starting position of the aircraft.

What is claimed is:

1. A method for identifying a position of a mobile platform, the method comprising:
   receiving, by a processor unit, images provided by a camera system on a first mobile platform,
      wherein the images include images of features and images of a second platform;
   identifying, by the processor unit, a first position and a first position accuracy from the features in the images from shifts in positions of the features in the images;
   identifying, by the processor unit, a second position and a second position accuracy using the images of the second platform and position information from the second platform; and
   determining, by the processor unit, an identified position and an identified position accuracy of the first mobile platform using a combination of the first position, the first position accuracy, the second position, and the second position accuracy,
   wherein the position information from the second platform identifies a location of the second platform.

2. The method of claim 1 further comprising:
   using the identified position and the identified position accuracy of the first mobile platform to control the first mobile platform.

3. The method of claim 1 further comprising:
   displaying the identified position of the first mobile platform and the identified position accuracy of the first mobile platform.

4. The method of claim 1,
   wherein the position information for the second platform is generated using images provided by a camera system on the second platform.

5. The method of claim 1, wherein the first mobile platform and the second platform are selected from a robot and an unmanned air vehicle.

6. An apparatus comprising:
   a camera system on a first mobile platform,
      wherein the camera system provides images and wherein the images include images of features and images of a second mobile platform;
   a communications system that receives the images; and
   a processor unit that
      identifies a first position and a first position accuracy from the features in the images from shifts in positions of the features in the images,
      identifies a second position and a second position accuracy using the images of the second mobile platform and position information from the second mobile platform, and
      determines an identified position and an identified position accuracy of the first mobile platform using a combination of the first position, the first position accuracy, the second position, and the second position accuracy,
   wherein the position information from the second mobile platform identifies a location of the second mobile platform.

7. The apparatus of claim 6 further comprising:
   a platform controller that uses the identified position and the identified position accuracy of the first mobile platform to control the first mobile platform.

8. The apparatus of claim 7, wherein the platform controller displays the identified position of the first mobile platform and the identified position accuracy of the first mobile platform.

9. The apparatus of claim 6,
   wherein the position information for the second mobile platform is generated using images provided by a camera system on the second mobile platform.

10. The apparatus of claim 6, wherein the identified position of the first mobile platform is a first identified position and wherein the processor unit determines a second identified position of the first mobile platform without using the position information for the second mobile platform; and determines a final identified position of the first mobile platform using the first identified position of the first mobile platform and the second identified position of the first mobile platform.

11. The apparatus of claim 6, wherein the first mobile platform and the second mobile platform are selected from a robot and an unmanned air vehicle.

12. A method for identifying a position of a mobile platform, comprising:

determining, by a processor unit, a plurality of identified positions and a plurality of identified position accuracies for the mobile platform using a plurality of different methods,
- wherein one of the plurality of different methods for identifying an identified position for the mobile platform includes
  - receiving images provided by a camera system on the mobile platform and
  - identifying a first position and a first position accuracy from features in the images from shifts in positions of the features in the images, and
- wherein a second one of the plurality of different methods for identifying an identified position for the mobile platform includes
  - identifying, by the processor unit, a second position and a second position accuracy using images of a second mobile platform and position information from the second mobile platform; and combining, by the processor unit, the plurality of identified positions and the plurality of identified position accuracies for the mobile platform to generate a final identified position and a final identified position accuracy for the mobile platform,
- wherein the final identified position of the mobile platform identifies a location and an orientation of the mobile platform.

13. The method of claim 12,
wherein the position information for the second mobile platform is generated using images provided by a camera system on the second mobile platform.

14. The method of claim 12 further comprising:
using the final identified position and the final identified position accuracy for the mobile platform to control the mobile platform.

15. The method of claim 12 further comprising:
displaying the final identified position and the final identified position accuracy for the mobile platform and the accuracy of the final identified position for the mobile platform.

16. The method of claim 12, wherein the mobile platform is selected from a robot and an unmanned air vehicle.

17. The method of claim 1,
wherein the features include fiducial markers;
wherein the combination is a statistical combination, a geometry combination, and a Baysian combination;
wherein the first mobile platform includes a number of working components;
wherein the number of working components include parts used to perform a task at a specific position in an operating environment;
wherein the number of working components includes manipulator arms;
wherein the method further comprises:
- determining, by the processor unit, whether the identified position accuracy is sufficient to perform the task,
  - wherein when the identified position accuracy is not sufficient, the task is not performed, and
  - wherein when the identified position accuracy is sufficient, the first mobile platform is controlled to perform the task;

wherein position identification at a sub-millimeter level is desired;
wherein the first mobile platform is one of a number of robots and identified position information and identified position accuracy information for the number of robots and a number of working components on the number of robots are displayed on a position information display; and
wherein each row of the position information display comprises
- a robot identifier,
- a working component identifier,
- position identifiers for X, Y, Z, pitch, roll, and yaw axes for a working component identified by the working component identifier and the robot identifier, and
- position accuracy identifiers for spatial units, angular units, a time between updates, and a latency.

* * * * *